United States Patent
Liu et al.

(10) Patent No.: US 8,573,717 B2
(45) Date of Patent: Nov. 5, 2013

(54) FRONT PANEL ASSEMBLY HAVING A SLIDING DOOR MECHANISM

(75) Inventors: Yung-Lung Liu, Taipei (TW); Chuan-Chieh Tseng, Taipei (TW); Jie-Dong Chen, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 383 days.

(21) Appl. No.: 12/986,537

(22) Filed: Jan. 7, 2011

(65) Prior Publication Data
US 2012/0056520 A1    Mar. 8, 2012

(30) Foreign Application Priority Data

Sep. 3, 2010 (CN) .......................... 2010 2 0522884
Nov. 17, 2010 (TW) .............................. 99222226 U

(51) Int. Cl.
*A47B 97/00* (2006.01)

(52) U.S. Cl.
USPC ..................................... 312/223.2; 361/679.6

(58) Field of Classification Search
USPC .......... 312/223.1, 223.2, 265.5, 265.6, 319.1, 312/292; 361/679.02, 724, 679.6
See application file for complete search history.

(56) References Cited

U.S. PATENT DOCUMENTS

| | | | | |
|---|---|---|---|---|
| 5,169,218 | A  * | 12/1992 | Chu | 312/223.2 |
| 6,398,327 | B1 * | 6/2002 | Momoze | 312/319.1 |
| 6,415,622 | B2 * | 7/2002 | Kim et al. | 62/409 |
| 7,375,955 | B2 * | 5/2008 | Xu | 361/679.55 |
| 7,443,688 | B2 * | 10/2008 | Chen et al. | 361/726 |
| 7,929,299 | B2 * | 4/2011 | Li et al. | 361/679.6 |
| 8,348,358 | B2 * | 1/2013 | Huang et al. | 312/223.2 |
| 2006/0261711 | A1* | 11/2006 | Li et al. | 312/223.2 |
| 2009/0154080 | A1* | 6/2009 | Lee et al. | 361/679.02 |
| 2009/0252487 | A1* | 10/2009 | Matsumoto | 396/448 |

* cited by examiner

*Primary Examiner* — James O Hansen
(74) *Attorney, Agent, or Firm* — Rosenberg, Klein & Lee

(57) ABSTRACT

A front panel assembly includes an inner cover plate having two first positioning pins, and a sliding door mechanism including a pair of slide rails each provided on a lateral side of the inner cover plate and having top and bottom ends. The first positioning pins are disposed intermediate of the pair of the slide rails. A door panel is slidable upward and downward along the slide rails, and has two second positioning pins. Two spring elements are disposed between the door panel and the inner cover plate. Each spring element has a first connecting end connected pivotally to a corresponding first positioning pin, and a second connecting end connected pivotally to a corresponding second positioning pin.

9 Claims, 7 Drawing Sheets

FRONT PANEL ASSEMBLY HAVING A SLIDING DOOR MECHANISM

CROSS-REFERENCE TO RELATED APPLICATION

This application claims priority of Chinese Application No. 201020522534.4, filed on Sep. 3, 2010.

BACKGROUND OF THE INVENTION

1. Field of the Invention

This invention relates to a front panel assembly of a computer housing, and more particularly to a front panel assembly having a sliding door mechanism.

2. Description of the Related Art

A computer mainframe is usually provided with a plurality of electrical port connectors, such as card readers, USB port connectors, earphone port connectors, microphone port connectors, etc. These port connectors are mostly provided on a front side of the housing to facilitate use the users. Further, the disk drive and the ON/OFF switch are also provided on the front side of the housing. Hence, the front side of the housing becomes a central area of operating interface, and the appearance of the housing is enhanced through the front panel. The front panel is formed with holes for accommodating different electrical port connectors, the disk drive, and the ON/OFF switch so that the operating interface of the housing is exposed and the remaining portion of the housing is covered by the front panel. The purpose of enhancing the appearance of the housing and protecting the components inside the housing can thus be achieved. However, when the port connectors are not in use, dust can easily accumulates therein. This may result in poor electrical contacts during use of the port connectors.

Some currently existing computer housings are provided with cover plates to overcome the aforesaid drawback. However, taking for example a frequently seen vertical type computer housing, a cover plate thereof is movable upward and downward to open and close positions, respectively, and is provided with a conventional sliding type mechanism including hook-and-groove structure to prevent the cover plate from sliding downward due to gravity. However, specific must be applied to engage or disengage the hook-and-groove structure, so that operation of the cover plate is not easy.

SUMMARY OF THE INVENTION

Therefore, an object of the present invention is to provide a front panel assembly of a computer housing that has a sliding door mechanism which can be operated easily.

According to this invention, a front panel assembly for mounting on an operating interface side of a computer housing comprises an inner cover plate having two opposite lateral sides, and a sliding door mechanism which includes a pair of slide rails. Each slide rail is provided on a respective lateral side of the inner cover plate, and has top and bottom ends. The inner cover plate further has a pair of first positioning pins disposed intermediate of the pair of the slide rails. The sliding door mechanism further includes a door panel and two spring elements. The door panel is connected movably to the inner cover plate, is slidable upward and downward along the slide rails, and has a pair of second positioning pins provided respectively on two opposite lateral sides of the door panel in proximity to the slide rails, respectively. The door panel selectively covers and uncovers a portion of the inner cover plate above the first positioning pins. The spring elements are disposed between the door panel and the inner cover plate. Each spring element has a first connecting end connected pivotally to one of the first positioning pins, and a second connecting end opposite to the first connecting end and connected pivotally to one of the second positioning pins. The second connecting ends of the spring elements are movable along with the door panel. The first and second connecting ends of each spring element is movable close to or away from each other through a sliding movement of the door panel along the slide rails to compress or expand the spring elements.

The efficiency of the present invention resides in the fact that through the presence of the spring elements, the door panel can be biased by the spring elements to move smoothly, so that operation of the door panel is easy.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
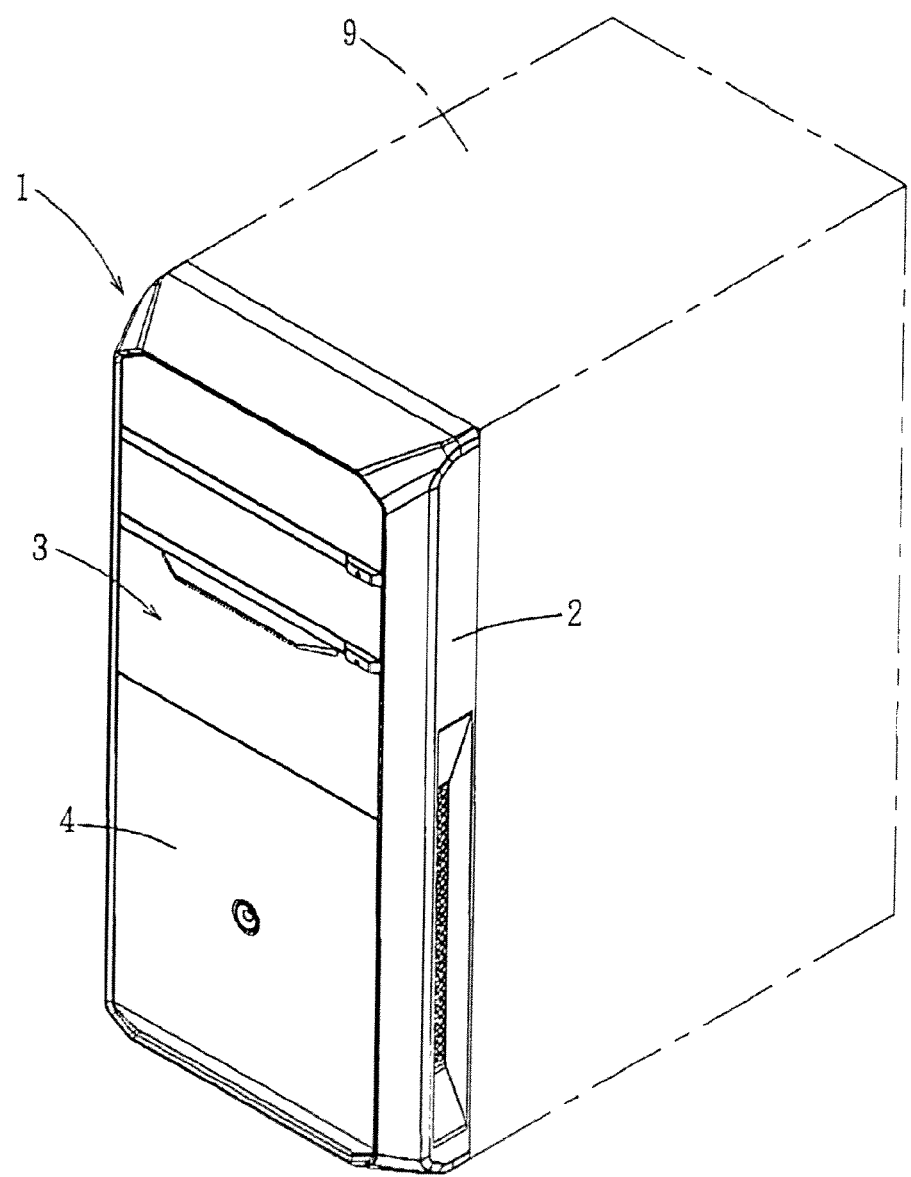
FIG. 1 is a perspective view of a front panel assembly according to the preferred embodiment of the present invention.
Figure 2:
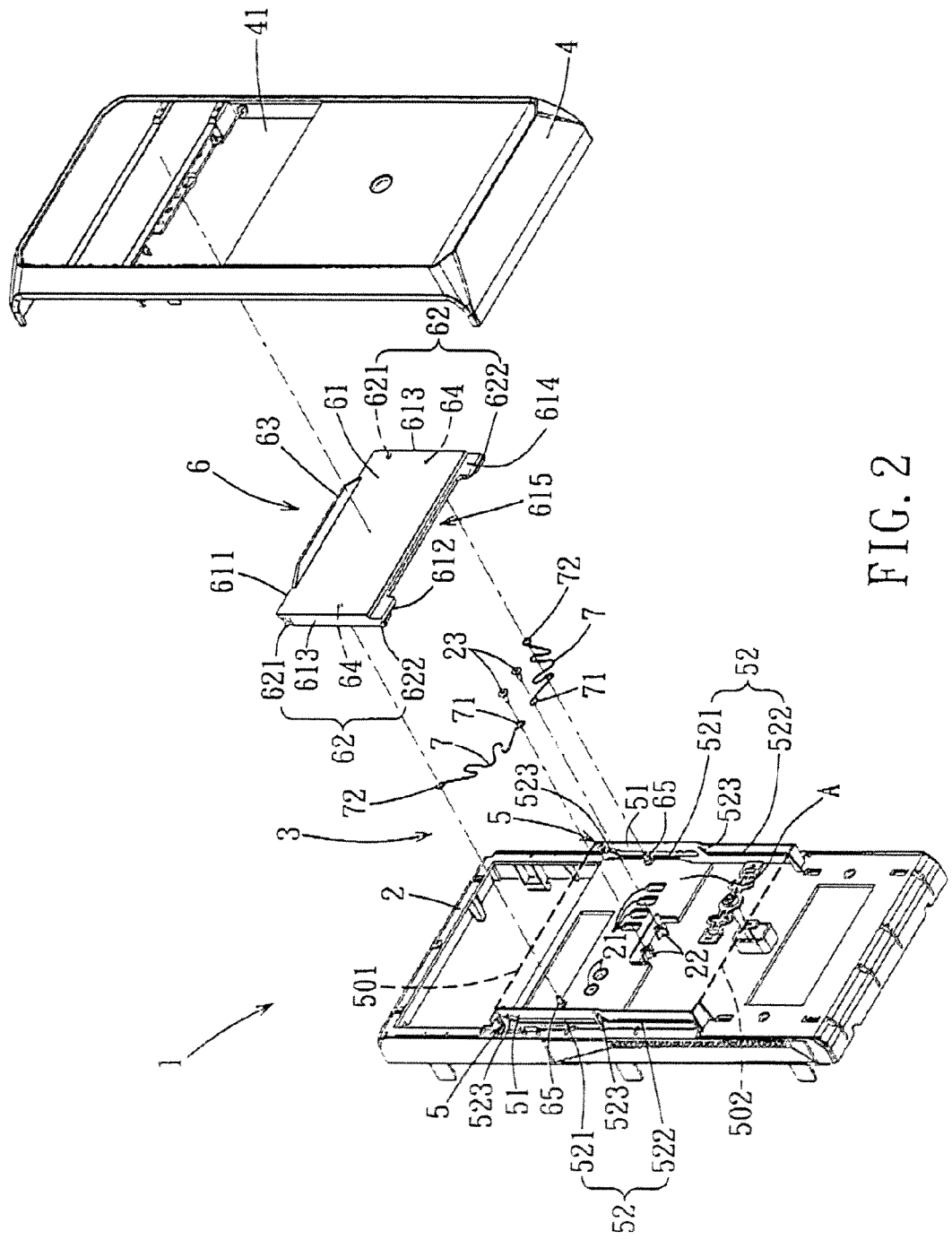
FIG. 2 is an exploded perspective view of the preferred embodiment.
Figure 3:
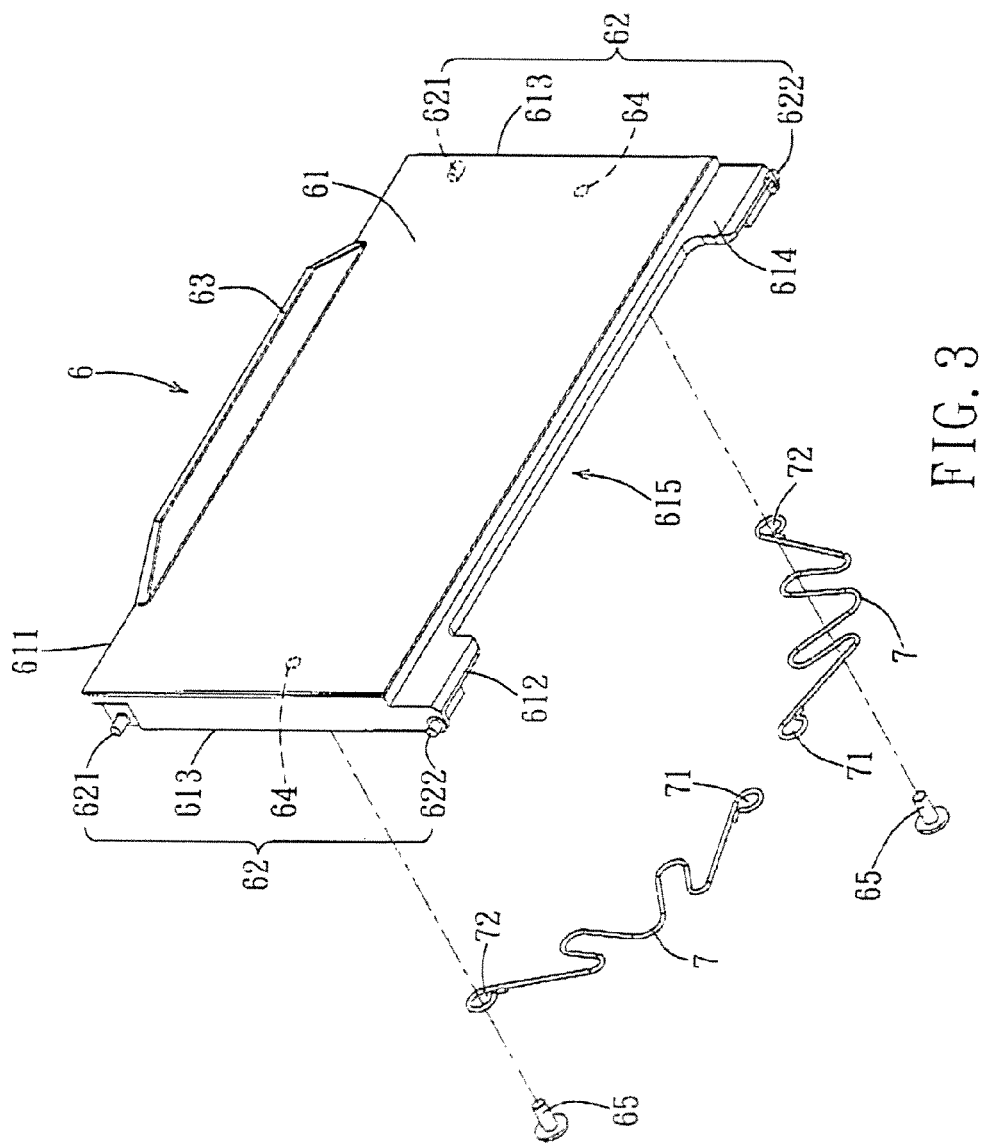
FIG. 3 is an enlarged perspective view of a door panel and two spring elements of the preferred embodiment.

The above-mentioned and other technical contents, features, and effects of this invention will be clearly presented from the following detailed description of a preferred embodiment in coordination with the reference drawings.

Referring to FIGS. 1 to 7, a front panel assembly 1 for mounting on an operating interface side of a computer housing 9 according to the preferred embodiment of the present invention comprises an inner cover plate 2, a sliding door mechanism 3, and an outer cover plate 4 covering the inner cover plate 2.

The inner cover plate 2 is for mounting on a body of the housing 9, and has two opposite lateral sides, and a pair of first positioning pins 22 disposed between the lateral sides thereof.

The sliding door mechanism 3 includes rails 5 provided respectively on the lateral sides of the inner cover plate 2. Each slide rail 5 has top and bottom ends. The inner plate 2 further has an area (A) defined between the slide rails 5 and between a tap line 501 extending through the top ends of the slide rails 5 and a bottom line 502 extending through the bottom ends of the slide rails 5. The first positioning pins 22 are disposed intermediate of the pair of the slide rails 5. Particularly, the first positioning pins 22 are disposed substantially on an intermediate part of the area (A). The area (A) is provided with a plurality of spaced-apart through holes 21 above the first positioning pins 22 for exposure of ports or holes electrical connectors (not shown).

Each slide rail 5 further has a rail plate 51 projecting from the inner cover plate 2 toward the outer cover plate 5, and a guide groove unit 52 formed in the rail plate 51. The guide groove unit 52 includes an upper guide groove 521 and a lower guide groove 522 both extending in a top-bottom direction. The upper and lower guide grooves 521, 522 are aligned with each other.

The sliding door mechanism 3 further includes a door panel 6 and two spring elements 7. The door panel 6 has a main body 61, two slide units 62, and a pair of second positioning pins 64. The main body 61 has a top side 611, a bottom side 612, and two opposite lateral sides 613 each interconnecting one end of the top side 611 to a respective end of the bottom side 612. The lateral sides 613 are parallel to the respective slide plates 51. The slide units 62 are provided respectively on the lateral sides 613 of the main body 61 in proximity to the respective slide rails 5. Each slide unit 62 includes an upper slide pin 621 projecting outwardly from a respective lateral side 613 in proximity to the zoo side 611, and a lower slide pin 622 projecting outwardly from the respective lateral side 613 in proximity to the bottom side 612. The second positioning pins 64 are provided respectively on the lateral sides 613 of the door panel 6 between the upper and lower slide pins 621, 622 and facing the inner cover plate 2.

The outer cover plate 4 has an access opening 41 corresponding in position to a portion of the area (A) that has the through holes 21 and that is above the first positioning pins 22. The slide rails 5 correspond in position to two opposite sides of the access opening 41.

Figure 4:
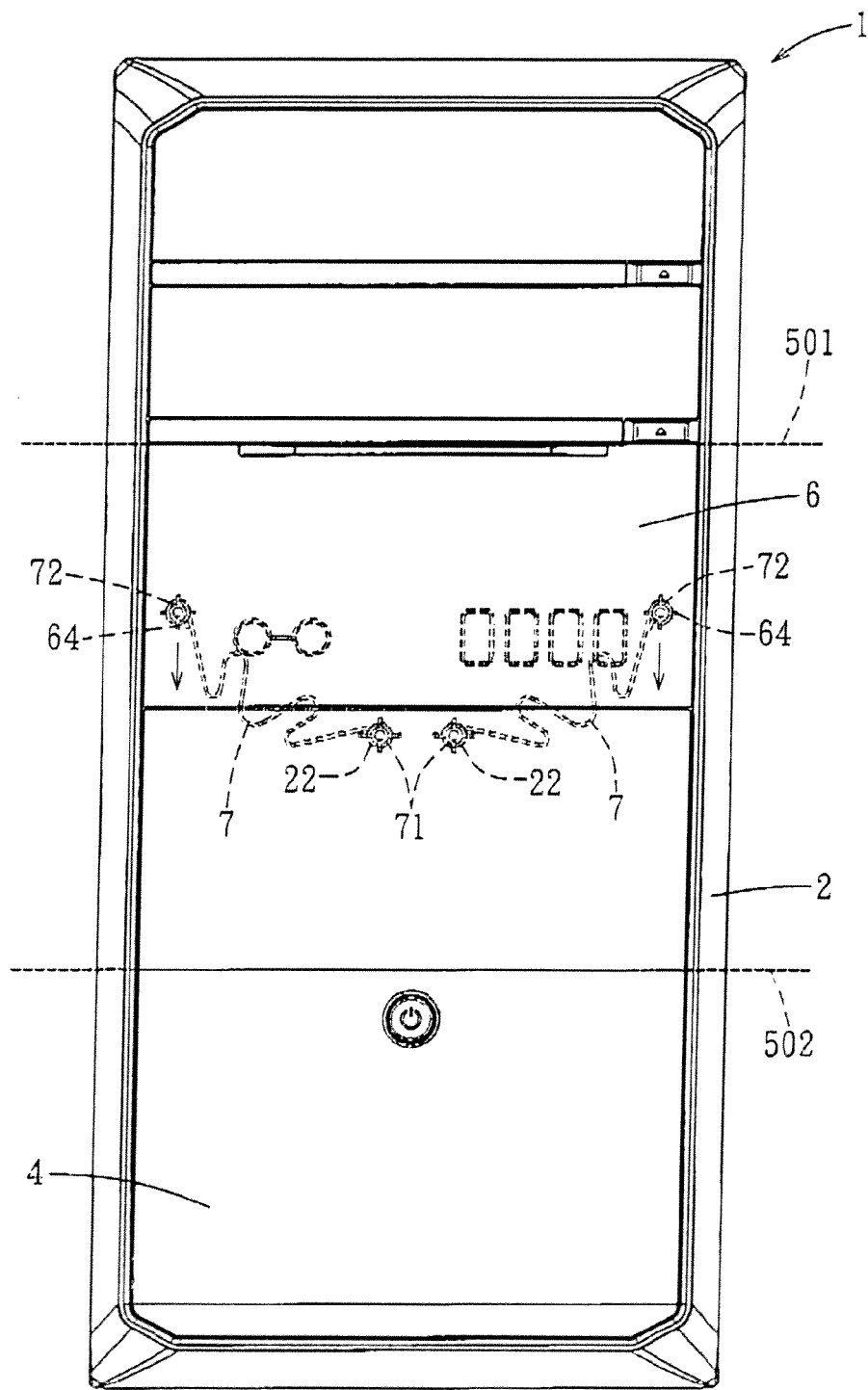
FIG. 4 is a schematic front view of the preferred embodiment.
Figure 5:
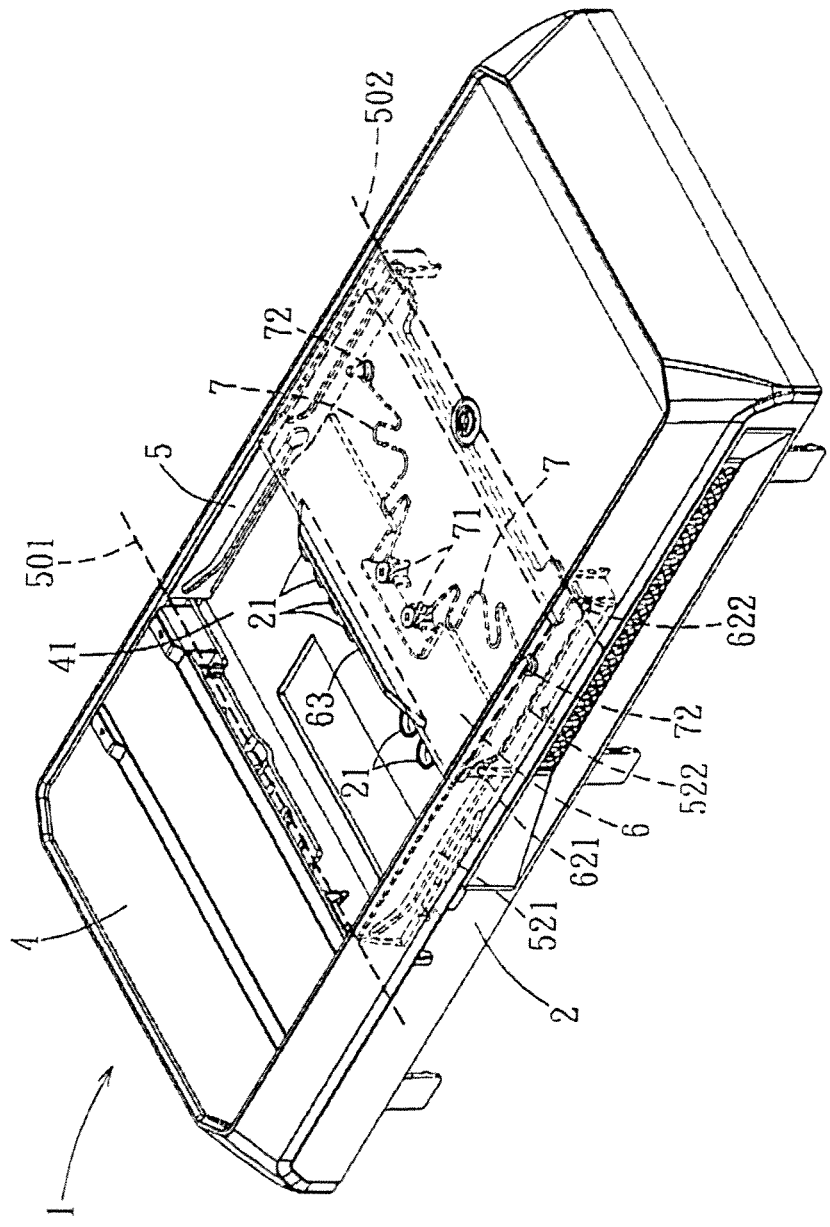
FIG. 5 is another perspective view of the preferred embodiment, illustrating a portion of an inner cover plate being uncovered.
Figure 6:
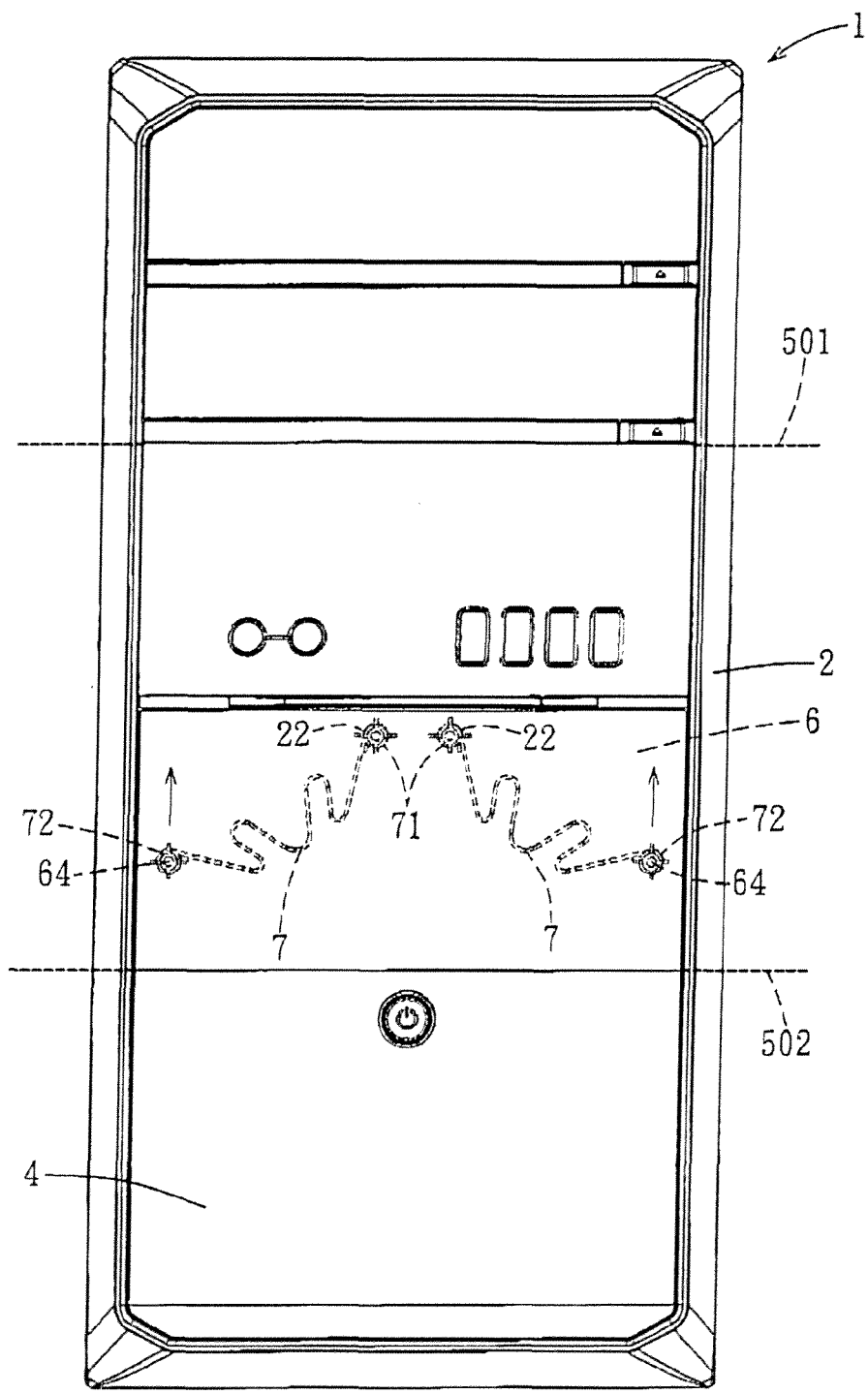
FIG. 6 is a schematic front view of FIG. 5.
Figure 7:
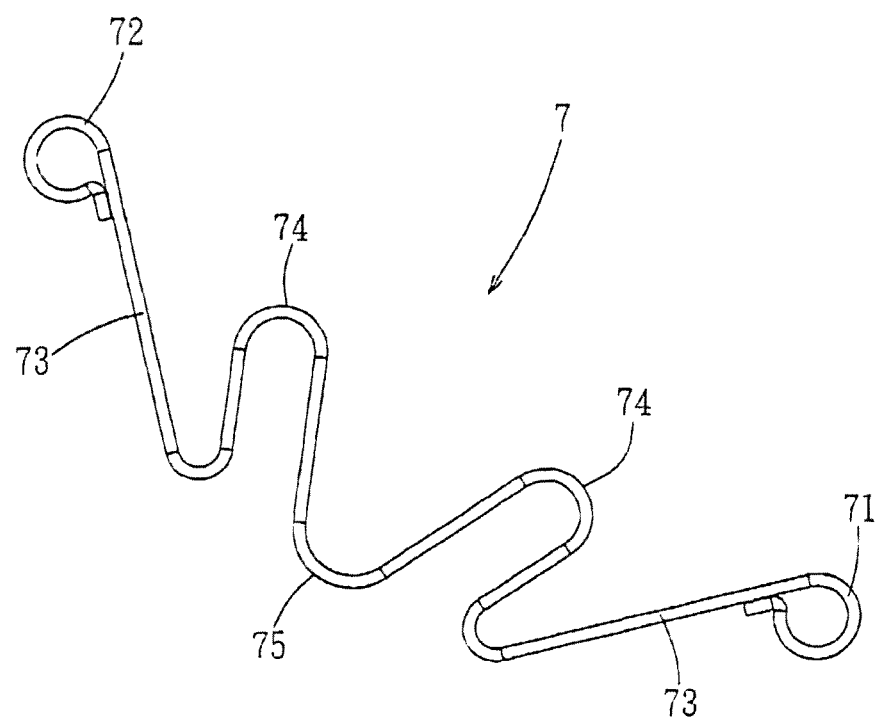
FIG. 7 is an enlarged perspective view of the spring element of the preferred embodiment.

The upper slide pins 621 of the slide units 62 are slidable in the respective first guide grooves 521 of the slide rails 5, and the lower slide pins 622 of the slide units 62 are slidable in the respective second guide grooves 522 of the slide rails 5, so that the door panel 6 is movable between the top and bottom lines 501, 502. The door panel 6 covers the access opening 41 and the portion of the area (A) that is above the first positioning pins 22 when reaching the top line 501, as shown in FIG. 4. The through holes 21 are covered by the door panel 6 at this time to prevent dust from entering the port connectors via the through holes 21. The door panel 6 uncovers the access opening 41 and said portion of the area (A) when reaching the bottom line 502, as shown in FIGS. 5 and 6. At this time, the through holes 21 are exposed for connection with electrical connectors.

The door panel 6 further has a handle member 63 proximate to the top side 611 and projecting from the main body 61 outwardly of the opening 41. Through the presence of the handle member 63, the door panel 6 can be operated easily to selectively cover and uncover the access opening 41 (is part of the outer cover plate 4, not inner cover plate 2) and the portion of the area (A) that is above the first positioning pins 22. The main body 61 is formed with a stepped portion 614 that is proximate to the bottom side 612. When the door panel 6 reaches the top line 501 to cover the access opening 41, the stepped portion 614 is located in an inner side of the outer cover plate 4, and the remaining portion of the main body 61 occupies the space of the access opening 41. The stepped portion 614 is formed with an indentation 615 that extends inwardly from a central portion of the bottom side 612 to facilitate mounting of the spring elements 7 as will be explained below.

Each of the spring elements 7 is configured as a corrugated metal rod that includes a plurality of bends lying on a same plane. Each spring element 7 has a first connecting end 71, and a second connecting end 72 opposite to the first connecting end 71. Each of the first and second connecting ends 71, 72 is configured as a loop (see FIG. 7). The first and second connecting ends 71, 72 of each spring element 7 are connected pivotally and respectively to the inner cover plate 2 and the door panel 6. The first connecting end 71 is connected pivotally to one of the first positioning pins 22 by engaging a screw 23 with an internal thread of the first positioning pin 22. The second connecting end 72 of each spring element 7 is connected pivotally to one of the second positioning pins 64 by engaging a screw 65 with an internal thread of the second positioning pin 64. The first and second connecting ends 71, 72 of each spring element 7 is movable close to or away from each other to compress or expand the spring elements 7 through a sliding movement of the door panel 6 along the slide rails 5.

Each spring element 7 further has two substantially V-shaped outer sections 73, two substantially U-shaped connections 74, and a substantially V-shaped intermediate section 75. Each outer section 73 has an outer end connected to a respective one of the first and second connecting ends 71, 72, and an inner end connected to an outer end of a respective U-shaped connection 74. The intermediate section 75 has two opposite ends connected respectively to inner ends of the U-shaped connections 74. The length of each spring element 7 from the first connecting end 71 to the second connecting end 72 and a distance traveled by the door panel 6 from a position that reaches the top line 501 to another position that reaches the bottom line 502 have a proportion of 1:0.9~1.1. The length of each spring element 7 from the first connecting end 71 to the second connecting end 72 and the width of the door panel 6 have a proportion of 1:0.9~0.6. Further, the diameter of the metal rod and the angle of curvature of each spring element 7 can be adjusted according to the weight of the door panel 6 and the amount of frictional force produced during sliding movement of the door panel 6, so that the restoring force of the spring element 7 will be sufficient enough to overcome the weight of the door panel and the frictional force to thereby push the door panel 6 from the position that reaches the top line 501 to the position that reaches the bottom line 502 and vice versa.

It should be noted that if the restoring force spring element 7 is excessively larger than the weight of the door panel 6 and the frictional force, noise is produced when the spring elements 7 push the door panel 6. In contrast, if the restoring force of each spring element 7 is small than the weight of the door panel 6 and the frictional force, the spring elements 7 cannot push the door panel 6.

In this embodiment, since a distance of each slide rail 5 from the top line 501 to the bottom line 502 is larger than the length of each lateral side 613 of the door panel 6, a moving path of the door panel 6 is long. In order for the spring elements 7 to be able to provide additional force to the door panel 6, middle portions of the slide rails 5 should be proximate to the first positioning pins 22, so that the range of biasing movement of the spring elements 7 can be enlarged. Hence, the spring elements 7 can exert additional force to the door panel 6 when the latter reaches the top or bottom line 501, 502. In other words, the first positioning pins 22 are located along a line that extends through a junction of the first and second guide grooves 521, 522 of each slide rail 5.

The second connecting ends 72 of the spring elements 7 are movable along with the door panel 6, and the first connecting ends 71 of the spring elements 7 are positioned on the respective first positioning pins 22. Through such a configuration, with the first connecting ends 71 of the spring elements 7 serving as fulcrums, when the door panel 6 moves to the intermediate part of the area (A), the spring elements 7 are compressed to store energy, and when the door panel 6 moves away from the intermediate part of the area (A) toward the top or bottom line 501, 502, the spring elements 7 expand to release the energy to thereby bias the door panel 6 toward the top or bottom line 501, 502.

With reference to FIG. 6, when it is desired to uncover the access opening 41, the handle member 63 of the door panel 6 is pushed downward to slide the door panel 6 toward the bottom line 502. Simultaneously, the second connecting ends 72 of the spring elements 7 move downward along with the door panel 6, and the distance between the first and second connecting ends 71, 72 of each spring element 7 gradually becomes small to compress the spring elements 7. When the second connecting ends 72 of the spring elements 7 and the two first positioning pins 22 are located on a straight line, the distance between the first and second connecting ends 71, 72 is the smallest largest compression). When the door panel 6 moves continuously toward the bottom line 502, the second connecting ends 72 of the spring elements 7 bias the door panel 6 toward the bottom line 502 through a restoring force thereof, thereby exposing the access opening 41 and thus the through holes 21. Applying the same principle, when it is desired to cover the access opening 41 and the through holes 21, the handle member 63 is pushed upward to slide the door panel 6 from a position reaching the bottom line 502 to another position reaching the top line 501. The door panel 6 is similarly biased toward the top line 501 through a restoring force of the spring elements 7. With the line extending through the junction of the first and second guide grooves 521, 522 of each slide rail 5 serving as a crucial line, whether the door panel 6 is moved toward the top or bottom line 501, 502, as long as the second connecting ends 72 of the spring elements 7 move past the crucial line, the door panel 6 will automatically slide to the position reaching the top or bottom line 501, 502. Hence, by applying a light force to the handle member 63, the door panel 6 can be slid smoothly to uncover or cover the access window 41 and thus the through holes 21. Hence, operation of the door panel 6 is easy and simple.

To assemble the front panel assembly 1, the screws 65 extend respectively through the loop-shaped second connecting ends 72 of the spring elements 7, and engage threadedly and respectively the internal threads of the second positioning pins 69, thereby positioning the second connecting ends 72 to the door panel 6. Subsequently, the door panel 6 is mounted onto the slide rails 5, so that the door panel 6 is disposed at a position covering the access window 91. Through the indentation 615 in the door panel 6, the first positioning pins 22 are exposed, and the screws 23 extend respectively through the loop-shaped first connecting ends 71 and engage threadedly and respectively the first positioning pins 22, thereby positioning the first positioning pins 71 on the inner cover plate 2. Finally, the inner and outer cover plates 2, 9 are assembled together to form the front panel assembly 1 of the present invention.

For the door panel 6 to be almost parallel to the outer cover plate 4, in this embodiment, each of the upper and lower guide grooves 521, 522 has a top end portion 523 slanting toward the outer cover plate 4, so that when the door panel 6 moves upwardly and reaches the top line 501, the door panel 6 is flush with a front face of the outer cover plate 4. That is, when the door panel 6 covers the access window 41, there is no gap between the door panel 6 and the outer cover plate 4, thereby forming a substantially integral body having a flat surface. Alternatively, the first and second guide coves 521, 522 may communicate with each other, and the top end portion 523 is straight. The purpose of allowing the door panel 6 to slide to the position reaching the top or bottom, line 501, 502 may also be achieved.

It should be noted that, in the absence of the spring elements 7, the door panel 6 is likely to fall down along the slide rails 5 due to gravity when it reaches the top line 501. The spring elements 7, therefore, provide that additional force to prevent the door panel 6 from falling, and simultaneously assist the door panel 6 to be positioned between the position covering the access window 41 and the position uncovering the access window 41.

In summary, the front panel assembly 1 of the present invention makes use of the sliding door mechanism 3 to protect the electrical port connectors, and uses the corrugated spring elements 7 to bias the door panel 6 so that the door panel 6 can slide smoothly along the slide rails 5. Further, door panel 6 can be easily operated through the presence of the handle member 63. Moreover, through the top end portion 523 of each of the first and second guide grooves 521, 522 that slants upwardly toward the outer cover plate 4, the door panel 6 may be flush with the front face of the outer cover plate 4 when the door panel 6 moves to the position covering the access window 41, so that the appearance of the present invention may be enhanced. Hence, the object of the present invention can be realized.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A front panel assembly for mounting on an operating interface side of a computer housing, said front panel assembly comprising:
   an inner cover plate having two opposite lateral sides; and
   a sliding door mechanism including a pair of slide rails each of which is provided on a respective one of said lateral sides of said inner cover plate and each of which has top and bottom ends; and
   an outer cover plate covering said inner cover plate;
   said inner cover plate further having a pair of first positioning pins disposed intermediate of the pair of said slide rails;
   said sliding door mechanism further including
      a door panel that is connected movably to said inner cover plate, that is slidable upward and downward along said slide rails, and that has a pair of second positioning pins provided respectively on two opposite lateral sides of said door panel in proximity to said slide rails, respectively, said door panel selectively covering and uncovering a portion of said inner cover plate above said first positioning pins; and
      two spring elements disposed between said door panel and said inner cover plate, each of said spring elements having a first connecting end connected pivotally to one of said first positioning pins, and a second connecting end opposite to said first connecting end and connected pivotally to one of said second positioning pins, said second connecting ends of said spring elements being movable along with said door panel;
      wherein, said first and second connecting ends of each of said spring elements is movable close to or away from each other to compress or expand said spring elements during a sliding movement of said door panel along said slide rails;
      wherein said inner cover plate further comprises an area defined between said slide rails and between a top line extending through said top ends of said slide rails and a bottom line extending through said bottom ends of said slide rails, said first positioning pins being disposed substantially on an intermediate part of said area;

wherein said outer cover plate has an access opening corresponding in position to said portion of said inner cover plate, and wherein said door panel covers said access opening when reaching said top line, and uncovers said access opening when reaching said bottom line.

2. The front panel assembly of claim 1, wherein said door panel covers said portion of said inner cover plate above said first positioning pins when reaching said top line, and uncovers said portion of said inner cover plate when reaching said bottom line.

3. The front panel assembly of claim 2, wherein the length of each of said spring elements from said first connecting end to said second connecting end and a distance traveled by said door panel from a position that reaches said top line to another position that reaches said bottom line have a proportion of 1:0.9~1.1, and the length of each of said spring elements from said first connecting end to the second connecting end and the width of said door panel have a proportion of 1:0.4~0.6.

4. The front panel assembly of claim 1, wherein said slide rails are aligned respectively with two opposite sides of said access opening, each of said slide rails having a rail plate projecting from said inner cover plate toward said outer cover plate, and a guide groove unit formed in said rail plate, said door panel further having two slide units projecting respectively from said lateral sides of said door panel into said guide groove units of said slide rails, respectively.

5. The front panel assembly of claim 4, wherein said door panel further has a top side and a bottom side connected between said lateral sides of said door panel, each of said guide groove units including an upper guide groove and a lower guide groove both extending in a top-bottom direction, said upper and lower guide grooves being aligned with each other, each of said slide units including an upper slide pin proximate to said top side and slidable in said upper guide groove, and a lower slide pin proximate to said bottom side and slidable in said lower guide groove, each of said upper and lower guide grooves having a top end portion slanting toward said outer cover plate, so that said door panel is flush with a front face of said outer cover plate when reaching said top line.

6. The front panel assembly of claim 5, wherein said door panel further has a handle member proximate to said top side of said door panel and projecting from said door panel outwardly of said access opening.

7. The front panel assembly of claim 1, wherein each of said spring elements is configured as a corrugated metal rod that includes a plurality of bends lying on a same plane.

8. The front panel assembly of said claim 1, wherein said second positioning pins are provided on said door panel facing said inner cover plate.

9. A front panel assembly for mounting on an operating interface side of a computer housing, said front panel assembly comprising:

an inner cover plate having two opposite lateral sides; and a sliding door mechanism including a pair of slide rails each of which is provided on a respective one of said lateral sides of said inner cover plate and each of which has top and bottom ends;

said inner cover plate further having a pair of first positioning pins disposed intermediate of the pair of said slide rails;

said sliding door mechanism further including a door panel that is connected movably to said inner cover plate, that is slidable upward and downward along said slide rails, and that has a pair of second positioning pins provided respectively on two opposite lateral sides of said door panel in proximity to said slide rails, respectively, said door panel selectively covering and uncovering a portion of said inner cover plate above said first positioning pins; and two spring elements disposed between said door panel and said inner cover plate, each of said spring elements having a first connecting end connected pivotally to one of said first positioning pins, and a second connecting end opposite to said first connecting end and connected pivotally to one of said second positioning pins, said second connecting ends of said spring elements being movable along with said door panel;

wherein, said first and second connecting ends of each of said spring elements is movable close to or away from each other to compress or expand said spring elements during a sliding movement of said door panel along said slide rails;

wherein each of said spring elements is configured as a corrugated metal rod that includes a plurality of bends lying on a same plane;

wherein each of said first and second connecting ends is configured as a loop, each of said spring elements further having two substantially V-shaped outer sections each having inner and outer ends, two substantially U-shaped connections each having inner and outer ends, and a substantially V-shaped intermediate section having two opposite ends, said outer ends of said outer sections being connected respectively to said first and second connecting ends, said inner ends of said outer sections being connected respectively to said outer ends of said U-shaped connections, said inner ends of said U-shaped connections being connected respectively to said two opposite ends of said intermediate section.

* * * * *